United States Patent
Inaba

(10) Patent No.: US 9,803,765 B2
(45) Date of Patent: Oct. 31, 2017

(54) MANIFOLD SOLENOID VALVE

(71) Applicant: Koganei Corporation, Koganei-shi, Tokyo (JP)

(72) Inventor: Joji Inaba, Koganei (JP)

(73) Assignee: KOGANEI CORPORATION, Koganei-shi, Tokyo (JP)

( * ) Notice: Subject to any disclaimer, the term of this patent is extended or adjusted under 35 U.S.C. 154(b) by 52 days.

(21) Appl. No.: 14/669,034

(22) Filed: Mar. 26, 2015

(65) Prior Publication Data

US 2015/0276080 A1    Oct. 1, 2015

(30) Foreign Application Priority Data

Mar. 27, 2014 (JP) ................. 2014-065097

(51) Int. Cl.
F15B 13/08 (2006.01)
F16K 27/00 (2006.01)
F16L 39/00 (2006.01)

(52) U.S. Cl.
CPC ........ F16K 27/003 (2013.01); F15B 13/0821 (2013.01); F15B 13/0839 (2013.01); *Y10T 137/87885* (2015.04)

(58) Field of Classification Search
CPC ......... Y10T 137/87885; F15B 13/0817; F15B 13/0821; F15B 13/0825; F15B 13/0828; F15B 13/081; F15B 13/0814; F16K 27/003; F16L 5/10; F16L 41/088; F16J 15/02; F16J 15/021; F16J 15/022; F16J 15/028; F16J 15/06

USPC ....... 285/124.1, 124.3, 124.4, 124.5, 133.21, 285/133.3, 139.2, 141.1, 239, 113, 285/215–216, 347; 277/590, 628, 630, 277/637, 638, 644

See application file for complete search history.

(56) References Cited

U.S. PATENT DOCUMENTS 3,234,963 A * 2/1966 Lyon ................... F15B 13/0817
                                                                137/884
3,572,368 A * 3/1971 Bullmer ................ F15B 13/081
                                                                137/269

(Continued)

FOREIGN PATENT DOCUMENTS

JP    H04119601 A    4/1992
JP    H04-119601     10/1992

(Continued)

*Primary Examiner* — Seth W Mackay-Smith
(74) *Attorney, Agent, or Firm* — McCormick, Paulding & Huber LLP

(57) ABSTRACT

An object of the present invention is to improve assembling workability of the flow passage block and the sealability between the manifold solenoid valve and the flow passage block. A flow passage block 61 is mounted on a manifold solenoid valve having valve bases 12 on which solenoid valves 11 are respectively mounted, a block mounting face 60 is formed by the valve bases 12, an output joint 36 protrudes from each valve base, a joint seal member 71 is detachably mounted on the output joint 36, with the flow passage block 61 being mounted on the block mounting face 60, the joint seal member 71 seals between an outer peripheral surface of an output joint 36 and an inner peripheral surface of an connecting hole 64 which communicates with an air passage of the flow passage block 61.

7 Claims, 8 Drawing Sheets

(56) References Cited

U.S. PATENT DOCUMENTS

| | | | | |
|---|---|---|---|---|
| 3,656,510 A * | 4/1972 | Kinner | ................... | F15C 1/02 137/884 |
| 3,785,389 A * | 1/1974 | Friedland | ............ | F15B 11/0426 137/1 |
| 4,095,863 A * | 6/1978 | Hardin | ................. | F15B 13/081 137/269 |
| 4,352,532 A * | 10/1982 | Hardin | ................. | H01R 13/74 137/269 |
| 4,529,214 A * | 7/1985 | Stoll | ................. | F15B 13/0821 277/607 |
| 4,619,378 A * | 10/1986 | de Man | ............... | B67D 1/0049 137/607 |
| 4,699,402 A * | 10/1987 | Stoll | ................. | F15B 13/0817 285/26 |
| 4,821,925 A * | 4/1989 | Wiley | ................. | B67D 1/0035 137/606 |
| 4,842,021 A * | 6/1989 | Stoll | ................. | F15B 13/081 137/271 |
| 4,921,282 A * | 5/1990 | Meisinger | ............. | G21C 3/328 285/104 |
| 5,000,226 A * | 3/1991 | Stoll | ................. | F15B 13/0814 137/884 |
| 5,064,227 A * | 11/1991 | Spors | ................. | F16L 37/0987 285/239 |
| 5,180,318 A * | 1/1993 | Moller | ............... | F15B 13/0817 137/884 |
| 5,458,048 A * | 10/1995 | Hohner | ............. | F15B 13/0814 137/624.2 |
| 5,462,087 A * | 10/1995 | Fukano | ............... | F15B 13/0825 137/596.16 |
| 5,529,088 A * | 6/1996 | Asou | ................... | F15B 13/0825 137/271 |
| 5,704,399 A * | 1/1998 | Hayashi | ............... | F15B 13/0817 137/271 |
| 5,895,027 A * | 4/1999 | Yagi | ................... | F16H 61/0009 137/560 |
| 6,832,788 B2 * | 12/2004 | Fukano | ................ | F16L 37/144 285/124.4 |
| 6,874,537 B2 * | 4/2005 | Hayashi | ............. | F15B 13/0814 137/269 |
| 7,370,674 B2 * | 5/2008 | Doyle | ................. | F15B 13/0817 137/884 |
| 7,918,486 B2 * | 4/2011 | Preisendorfer | ....... | F16L 41/088 285/136.1 |
| 8,042,839 B2 * | 10/2011 | Rammhofer | ........ | F16L 23/0283 285/215 |
| 2001/0003288 A1 * | 6/2001 | Clayton | ................. | E21B 34/04 137/884 |
| 2001/0037832 A1 * | 11/2001 | Weiss | ................. | F16K 31/0606 137/627.5 |
| 2012/0085953 A1 * | 4/2012 | Kato | ................. | F15B 13/0842 251/129.15 |
| 2014/0225363 A1 * | 8/2014 | Burgers | ............... | F28F 9/0258 285/124.5 |

FOREIGN PATENT DOCUMENTS

| | | |
|---|---|---|
| JP | H11118053 A | 4/1999 |
| JP | 2003314721 A | 11/2003 |

* cited by examiner

MANIFOLD SOLENOID VALVE

CROSS-REFERENCE TO RELATED APPLICATION

The present application claims priority from Japanese Patent Application No. 2014-065097 filed on Mar. 27, 2014, the content of which is hereby incorporated by reference into this application.

TECHNICAL FIELD OF THE INVENTION

The present invention relates to a manifold solenoid valve provided with a plurality of solenoid valves.

BACKGROUND OF THE INVENTION

Conventionally, a solenoid valve is used for controlling supply and supply stop of compressed air for a pneumatic apparatus such as a pneumatic cylinder, and for controlling a pneumatic circuit for selecting and switching pneumatic circuits. An apparatus composed as an aggregation of two or more solenoid valves is referred to as "manifold solenoid valve". There are two different types including "integrated type" and "stacking type" in this manifold solenoid valve. In the integrated type, an aggregation of two or more solenoid valves is carried out by mounting two or more solenoid valves on a large-sized manifold block formed with a common air supply flow passage and a common exhaust flow passage. On the other hand, the stacking type is also referred to as "divided type", and an aggregation of two or more solenoid valves is carried out by mounting two or more solenoid valves on respective separated small manifold blocks, i.e., mounting pedestals, and connecting the manifold blocks to each other.

One example of an integrated type manifold solenoid valve is disclosed in for example Patent Document 1, examples of a stacking type manifold solenoid valve are disclosed in for example Patent Documents 2 and 3.

PRIOR ART DOCUMENTS

Patent Documents

Patent Document 1: Japanese Patent Application Laid-Open Publication No. H11-118053;
Patent Document 2: Japanese Patent Application Laid-Open Publication No. 2003-314721; and
Patent Document 3: Japanese Utility Model Application Laid-Open Publication No. H04-119601.

SUMMARY OF THE INVENTION

A manifold base, i.e., a manifold block disclosed in Patent Document 1 is provided with an output port for communicating with an output port of a solenoid valve, and the output port opens on a front face of the manifold block. The manifold block is provided with: an air supply port which communicates with an air supply port of the solenoid valve; and an exhaust port which communicates with an exhaust port of the solenoid valve, and the air supply port and the exhaust port opens on an end face of the manifold block. A connecting member is mounted on each port formed in the manifold block, and a tube for conducting air is connected to the joint member.

In a manifold solenoid valve disclosed in Patent Document 2, two or more output joints protrude from a front face of the manifold block, and an air supply joint and an exhaust joint protrude from a side face of an end block. On the other hand, in a manifold solenoid valve disclosed in Patent Document 3, an output joint, an air supply joint and an exhaust joint protrude from a front face of the manifold solenoid valve. A tube for conducting air is connected to each joint member.

Conventionally, in order to supply compressed air to each solenoid valve and supply compressed air to an objective part as a pneumatic apparatus from the solenoid valves, a tube is connected to a joint member such as an output joint. Therefore, for replacing the manifold solenoid valve with another one, the tubes connected to all the joint members are needed to be detached from them, and it takes time to carry out that operation.

In order to solve a problem such as this, an air conducting method in which a flow passage block is connected to the manifold solenoid valve has been considered. In this air conducting method, since the flow passage block is formed with an air flow passage for conducting air, it is possible to mount various pneumatic apparatuses such as a filter on the flow passage block, and a tube for communicating with the air flow passage can be mounted on the flow passage block. When the flow passage block is mounted on the manifold solenoid valve, the manifold solenoid valve can be easily replaced by detaching the flow passage block from the manifold solenoid valve.

However, when mounting the flow passage block on the manifold solenoid valve, it is necessary to secure sealability between the joint member of the manifold solenoid valve and the air flow passage formed in the flow passage block. For sealing between the flow passage block and the manifold solenoid valves, it is considered that a plate-like sealing member is mounted between them. The manifold solenoid valve connected to two or more manifold blocks, when compressed air is applied, is warped slightly due to the reactive force. Due to this warp, a gap between the flow passage block and the manifold solenoid valve, while not changed in the center of the manifold solenoid valve, is large in each end of the manifold solenoid valve. Alternatively, the gap between the flow passage block and the manifold solenoid valve, while not changed in the both ends of the manifold solenoid valve to the contrary, may be changed largely in the center of the manifold solenoid valve. As mentioned above, when a plate-like sealing member is used, the supplied air will leak due to the gap caused by such warp.

An object of the present invention is to improve assembling workability of the flow passage block to the manifold solenoid valve while ensuring the sealability between the manifold solenoid valve and the flow passage block.

A manifold solenoid valve according to one aspect of the present invention, comprising: valve bases on which solenoid valves are respectively mounted; output joints which are provided so as to protrude from the respective valve bases, which communicate with output ports of the solenoid valves, and each of which has an annular engaging protruding part on an outer peripheral surface of the output joints; joint seal members for outputting air, each of which has an annular recess part on an inner peripheral surface of the joint seal members, wherein the annular engaging protruding part is fitted into the annular recess part, and an annular protruding seal part is provided on an outer peripheral surface of the joint seal members.

The output joints are provided so as to protrude from the respective valve bases, and a block mounting face on which a flow passage block is mounted is formed on the front face of the valve bases. The joint seal member for outputting air seals between an output joint and an connecting hole which communicates with an air passage of the flow passage block. When the flow passage block is mounted on the manifold solenoid valve with the joint seal member for outputting air is mounted on the output joint, sealing between the output joints and the connecting holes is carried out. Since the joint seal member for outputting air is arranged between the inner surface of the connecting hole and the outer peripheral surface of the output joint, even if a gap between the block mounting face of the valve base and the flow passage block is changed, the joint seal members for outputting air are just moved in the axial direction in the respective connection holes. Therefore, it is possible to improve the attaching workability of the flow passage block to the manifold electromagnetic valve without reducing the sealability between the flow passage block and the valve base.

DESCRIPTION OF THE PREFERRED EMBODIMENTS

Figure 1:
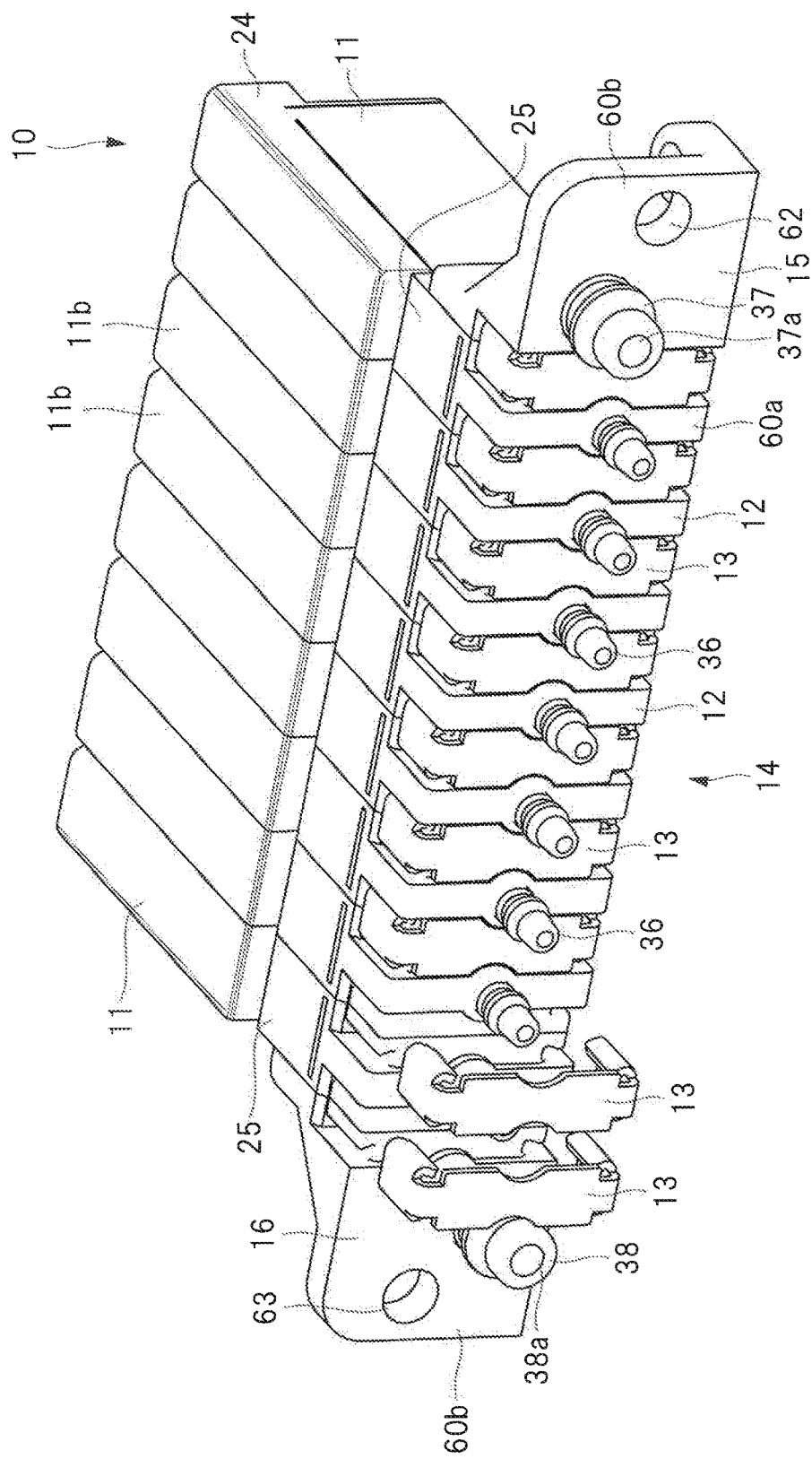
FIG. 1 is a perspective view showing an outline of a manifold solenoid valve according to one embodiment.
Figure 2:
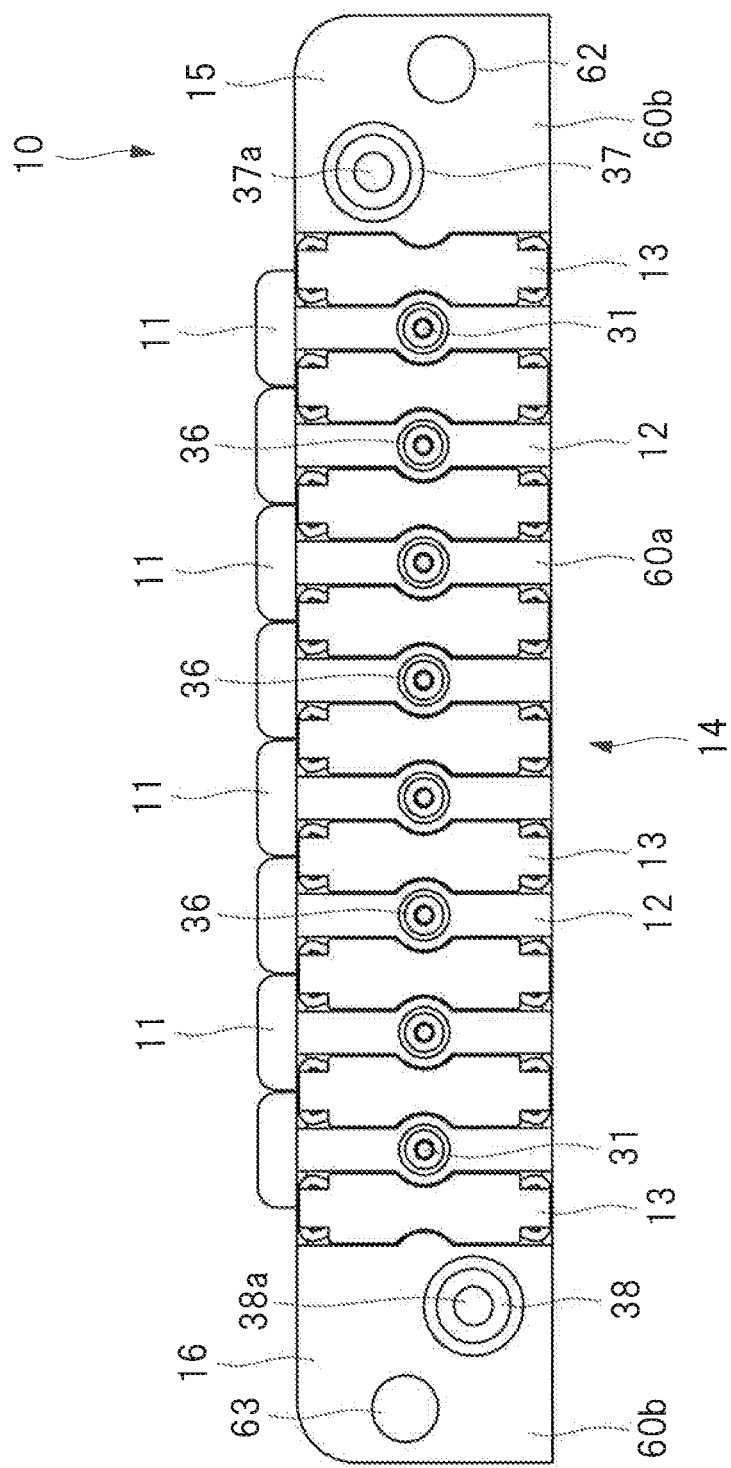
FIG. 2 is a front view of the manifold solenoid valve of FIG. 1.
Figure 3:
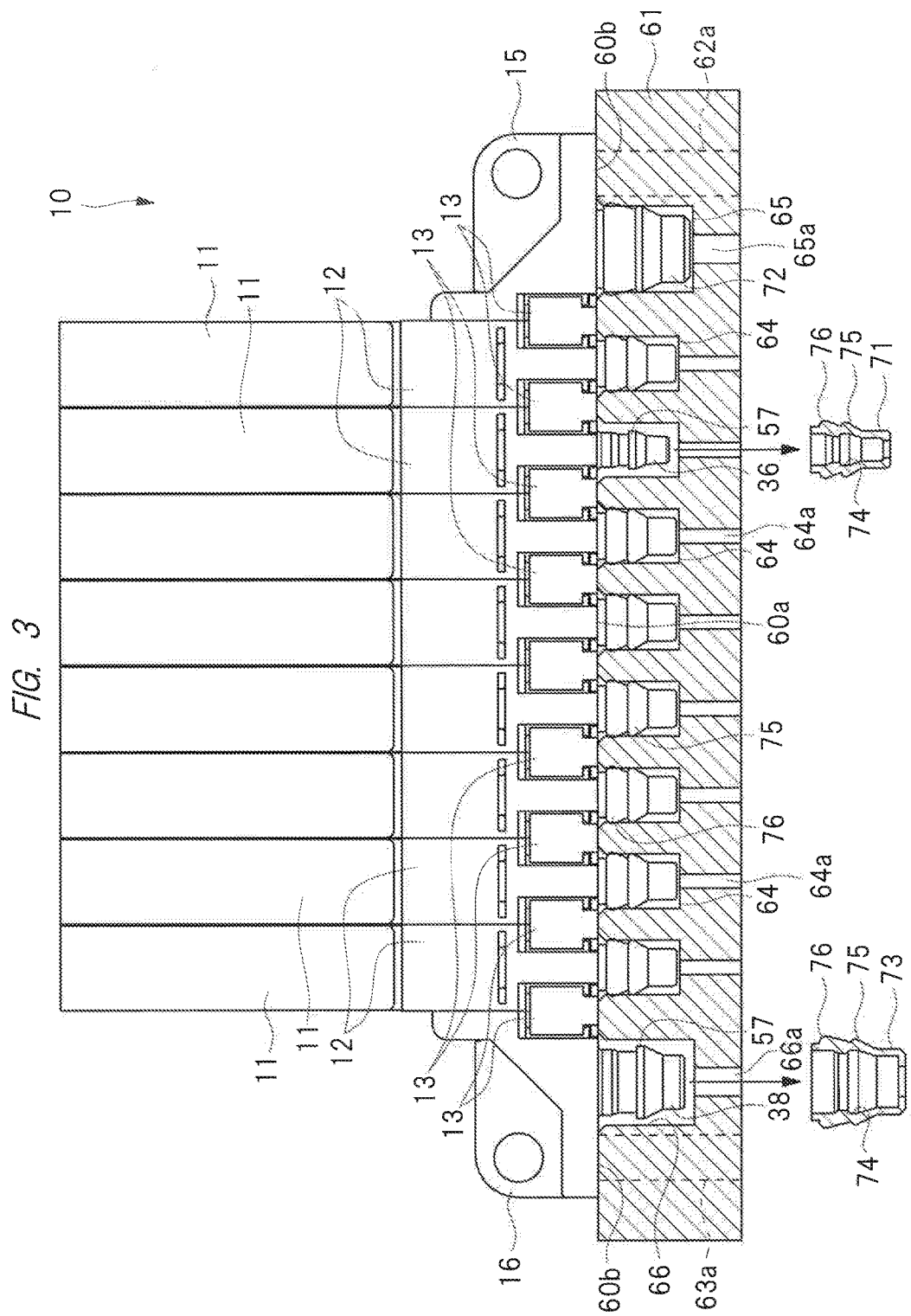
FIG. 3 is a plan view of the manifold solenoid valve attached to a flow passage block.

Hereinafter, an embodiment of the present invention will be described in detail on the basis of the attached drawings. As shown in FIGS. 1 to 3, a manifold solenoid valve 10 has two or more solenoid valves 11, and each solenoid valve 11 is mounted on a back face of a valve base 12 as a manifold block. The solenoid valves 11 are mounted on the respective valve bases 12, and the manifold solenoid valve 10 is a stacking type which is composed of aggregation of two or more solenoid valves 11. The manifold solenoid valve 10 is assembled so that the valve bases 12 are arranged side-by-side, and valve bases adjacent to each other abut on each other via their side faces. Although the manifold solenoid valve 10 has eight solenoid valves 11 in this embodiment, the manifold solenoid valve 10 having any number of solenoid valves 11 can be assembled by aggregating two or more solenoid valves 11.

Two valve bases 12 are adjacent to each other and arranged so as to abut on each other via their side faces, and connected to each other with a connecting attachment 13. As shown in the figures, a valve base assembly 14 is assembled by abutting and connecting eight valve bases 12 to each other with the connecting attachments 13. A first end block 15 is mounted on one end face of the valve base assembly 14, and a second end block 16 is mounted on the other end face of the valve base assembly 14. The end blocks 15 and 16 are connected with the connecting attachments 13 to the respective end faces of two valve bases 12 arranged on both side of the valve base assembly 14.

Figure 8:
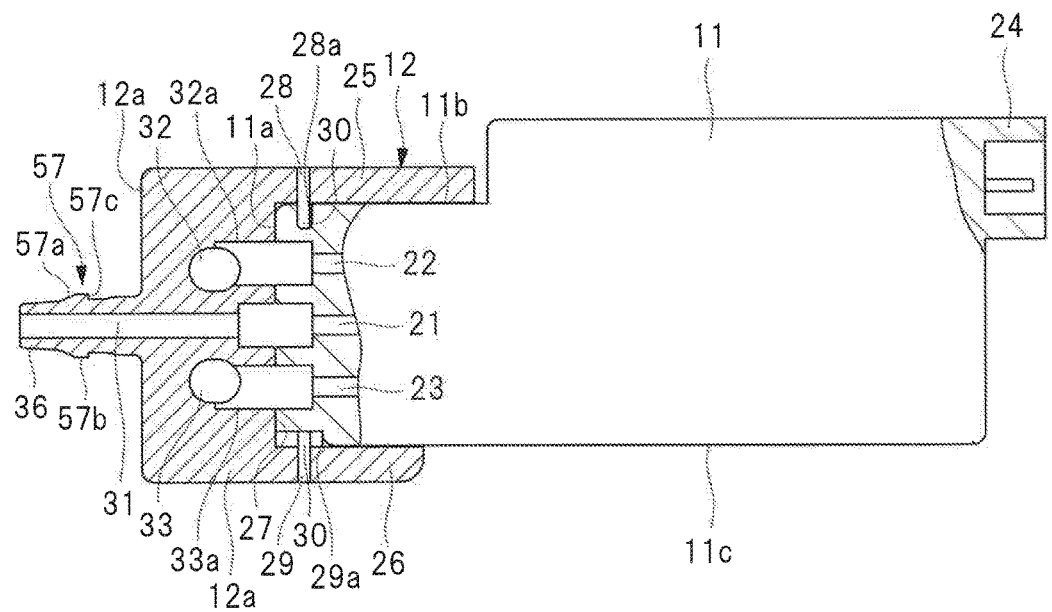
FIG. 8 is a sectional view showing a valve base to which the solenoid valve is attached.

In general, the solenoid valve 11 has the shape of a nearly rectangular parallelepiped, and output port 21, air supply port 22, and exhaust port 23 open on one end face as shown in FIG. 8. The output port 21 is provided at a central part in a vertical direction in FIG. 8, and the air supply port 22 is provided on the upper side of the output port 21, and the exhaust port 23 is provided on the lower side of the output port 21. If those ports open on a front face of the solenoid valve 11, this solenoid valve 11 is referred to as a three-port solenoid valve with those ports which open on the front face.

A valve body (not shown) is incorporated in the solenoid valve 11, and operated between a position for communicating the air supply port 22 with the output port 21 while preventing the output port 21 and the exhaust port 23 from communicating with each other, and a position for preventing the air supply port 22 and the output port 21 from communicating with each other while communicating the output port 21 with the exhaust port 23. In order to make the valve body perform the above switching operation, a solenoid (not shown), that is, an electromagnet is incorporated in the solenoid valve 11. A socket part 24 to supply a driving current to the solenoid is provided to the rear end part of the solenoid valve 11. A connector (not shown) is attached to this socket part 24.

In the solenoid valve 11, the output port 21, the air supply port 22, and the exhaust port 23 open on a front face 11a thereof, the shape thereof is a nearly rectangular parallelepiped, and a front side end part thereof is connected to the valve base 12. The valve base 12 has a body part 12a which has the shape of a nearly rectangular parallelepiped, and which extends vertically along the front face 11a of the solenoid valve 11 in FIGS. 4 and 8. One end part of the body part 12a is provided with a first fixing piece 25 protruding in a backward direction from the back face of the valve base 12, and the other end part of the body part 12a is provided with a second fixing piece 26 protruding in a backward direction in the same way. An abutting face 27 is defined between the fixing pieces 25 and 26 on the back face of the valve base 12. The solenoid valve 11 is mounted on the valve base 12 by abutting the front face 11a of the solenoid valve 11 on the abutting face 27.

When the solenoid valve 11 is mounted on the valve base 12, the first fixing piece 25 comes in contact with a distal end part of a top side face 11b of the solenoid valve 11, and the second fixing piece 26 comes in contact with a distal end part of a bottom side face 11c of the solenoid valve 11. In this way, the valve base 12 is mounted on the end part of the solenoid valve 11 so as to cover the front face side end part of the solenoid valve 11, that is, the front face 11a of the distal end part, part of the top side face 11b, and part of the bottom side face 11c.

The first fixing piece 25 is provided with a slit 28, and a slit 28a is provided on a top face side of the distal end part of the solenoid valve 11 so as to correspond to the slit 28. The second fixing piece 26 is also provided with a slit 29, and a slit 29a is provided on a bottom face side of the distal end part of the solenoid valve 11 so as to correspond to the slit 29. The solenoid valve 11 is fixed to the valve base 12 by inserting a fastener 30 in both slits 28 and 28a.

In the valve base 12, as shown in FIG. 8, an output hole 31 communicating with the output port 21 of the solenoid valve 11 is provided so as to open on the abutting face 27 of the valve base 12. The valve base 12 is provided with an air supply hole 32 penetrating in a width direction. The air supply hole 32 communicates with the air supply port 22 of the solenoid valve 11 via a communicating hole 32a which opens on the abutting face 27 of the valve base 12. In the valve base 12, an exhaust hole 33 is provided while penetrating in the width direction. The exhaust hole 33 communicates with the exhaust port 23 of the solenoid valve 11 via a communicating hole 33a which opens on the abutting face of the valve base 12. When two or more valve base 12 abut on each other, a common air supply flow passage communicating with the air supply port 22 of each solenoid valve 11 is formed by the air supply hole 32. In the same way, when two or more valve base 12 abut on each other, a common exhaust flow passage communicating with the exhaust port 23 of each solenoid valve 11 is formed by the exhaust hole 33.

Figure 4:
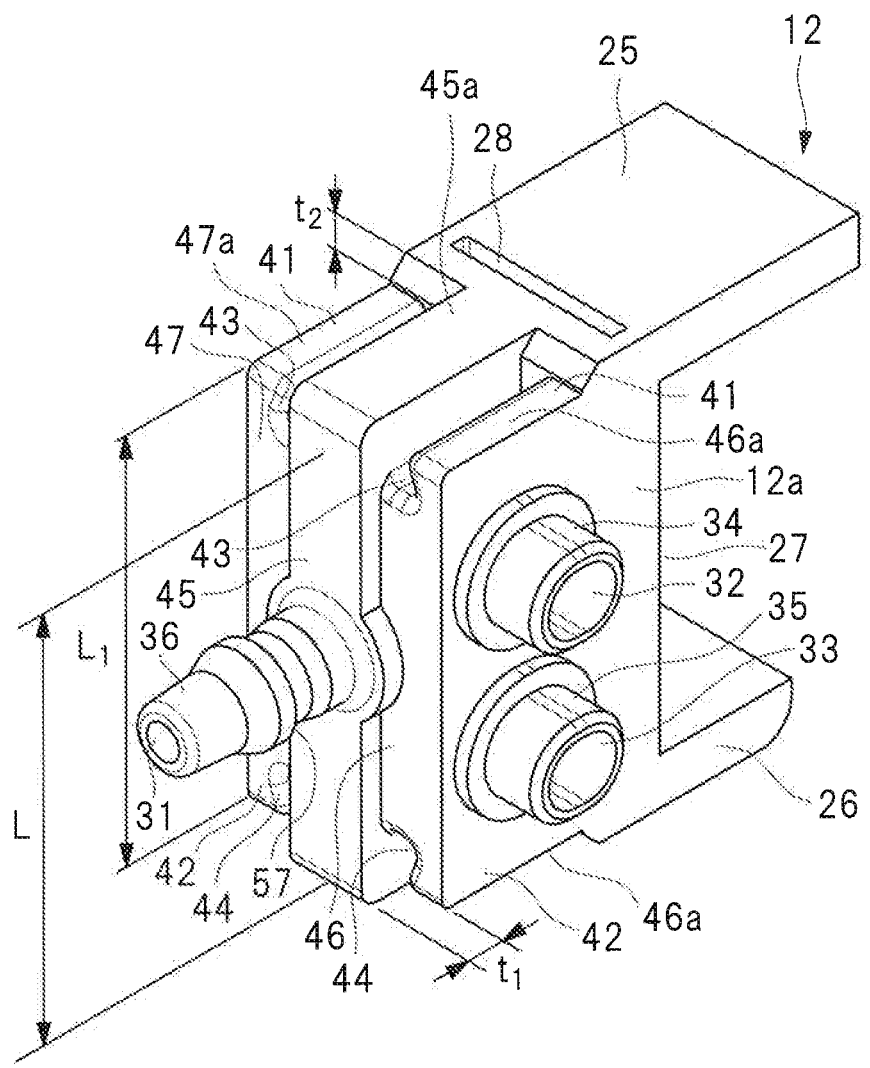
FIG. 4 is a perspective view showing a valve base to which a solenoid valve is mounted.

As shown in FIG. 4, on one side face of the valve base 12, a connecting cylinder part 34 in which the air supply hole 32 is formed is provided integrally, and the connecting cylinder part 34 protrudes from the side face. In the same way, on one side face of the valve base 12, a connecting cylinder part 35 in which the exhaust hole 33 is formed is provided uniformly, and the connecting cylinder part 35 protrudes from the side face. On the other side face of the valve base 12, a fitting hole (not shown), into which each of connecting cylinder parts 34 and 35 of the other valve base 12 adjacent to each other is fitted is provided. Each fitting hole has a larger diameter than each of the connecting cylinder parts 34 and 35. Therefore, when two or more valve base 12 abut on each other, the common air supply flow passage and exhaust flow passage are formed in a state where the connecting cylinder parts 34 and 35 of one valve base 12 are fitted in the fitting holes of the other valve base 12, respectively. Between connecting cylinder parts 34 and 35 and fitting holes, sealing is carried out by a sealing member (not shown).

As shown in FIG. 8, an output joint 36 is provided so as to protrude from the front face of each valve base 12, and the output hole 31 opens on a distal end face of the output joint 36. The end block 15 is, as shown in FIG. 1, provided with an air supply joint 37 protruding in a front face side, and a communicating hole 37a of the air supply joint 37 communicates with the common air supply flow passage. On the other hand, the end block 16 is provided with an exhaust joint 38 protruding in a front face side, and a communicating hole 38a of the exhaust joint 38 communicates with the common exhaust flow passage.

Compressed air is supplied to the communicating hole 37a of the air supply joint 37 from an air pressure supply source (not shown). The compressed air is supplied from the air pressure supply source to the air supply port 22 of each solenoid valve 11 via the air supply hole 32. The communicating hole 38a of the exhaust joint 38 communicates with the exhaust port 23 of the solenoid valve 11 via each exhaust hole 33, and the air from each exhaust ports 23 is discharged outside from the exhaust joint 38. Therefore, when the solenoid valves 11 are selectively driven, and the air supply port 22 and the output port 21 of the solenoid valve 11 is in a communicating state, the compressed air from the output port 21 is supplied to a supplied part of an external pneumatic apparatus, etc. from the output hole 31.

One end part of the valve base 12 is shown in FIG. 4 as being an upper side part, and each side of this end part is provided with a first protruding part 41 extending in a front-back direction of the valve base 12. The other end part of the valve base 12 is shown in FIG. 4 as being a lower side part, and each side of this end part is provided with a second protruding part 42 extending in a front-back direction. Concave grooves 43 and 44 are respectively provided on center sides of protruding parts 41 and 42. In this way, in the valve base 12, two first protruding parts 41 face in respective directions opposite to each other, and two second protruding parts 42 face in respective directions opposite to each other.

Figure 5:
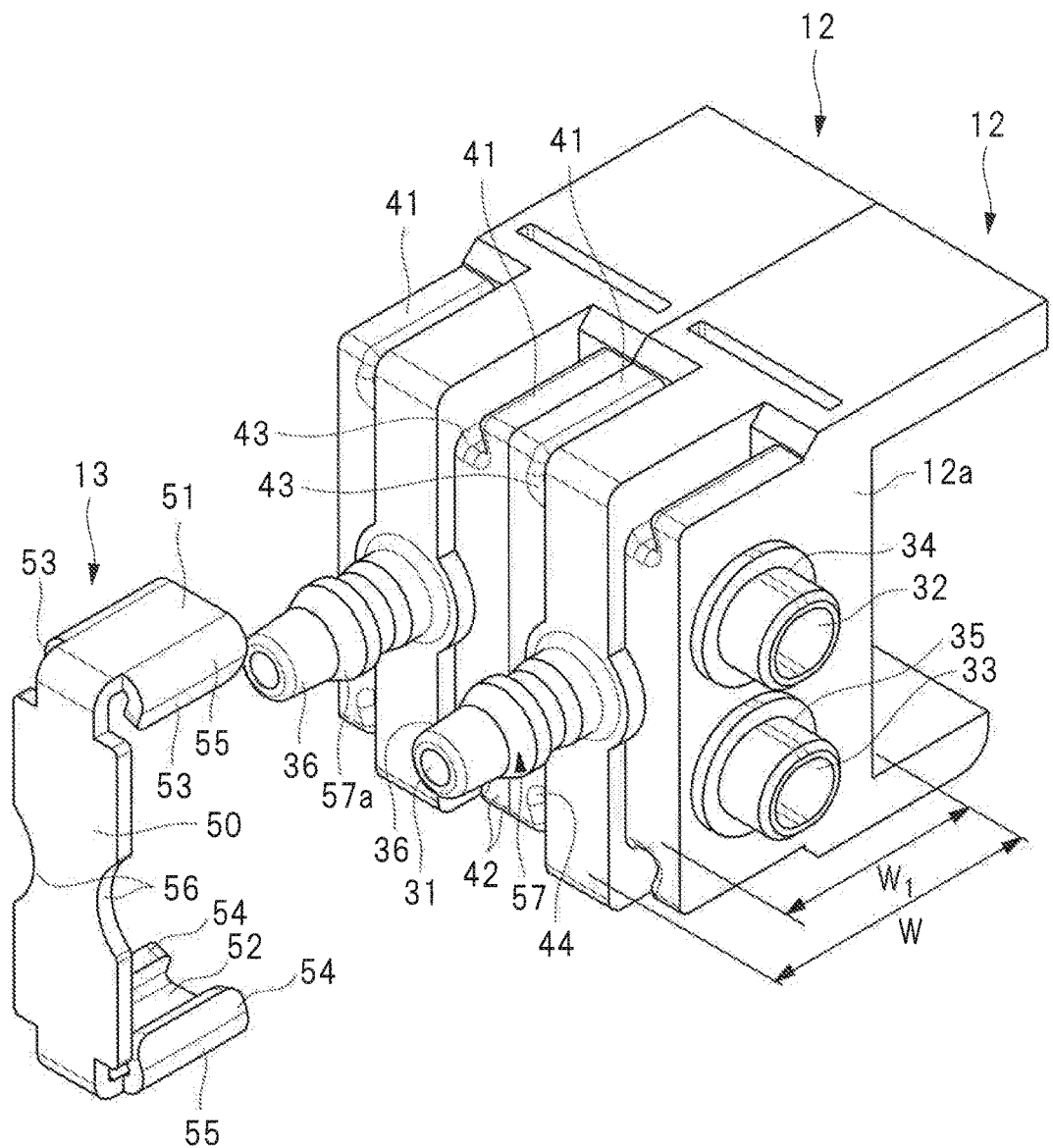
FIG. 5 is a perspective view showing two valve bases abutting on each other, and a connecting attachment.

The front face of the valve base 12 has a central part 45, and side parts 46 and 47 in a width direction thereof (hereinafter referred to as "first side parts 46 and 47"). The first side parts 46 and 47 are retreated from the central part 45, and an uneven part having a measurement "t1" is provided between the central part 45 and the first side parts 46 and 47. The end face of the upper and lower sides of the valve base 12 has: a central part 45a which is continuous to the central part 45 of the front face; and upper and lower side portions 46a and 47a in a height direction (hereinafter referred to as "both end portions 46a and 47a"), and the second side parts 46a and 47a are continuous to the first side parts 46 and 47 of the front face, respectively. The second side parts 46a and 47a are retreated from the central part 45a, and an even part having a size "t2" is provided between the central part 45a and the second side parts 46a and 47a. Therefore, the length "L1" of the body part 12a of the valve base 12 in the second side parts 46a and 47a are shorter than the length "L" in the height direction of the central part as shown in FIG. 4. Furthermore, as shown in FIG. 5, a front-back direction length "W1" between the first side parts 46 and 47 of the front face of the valve base 12 and the abutting face 27 of the back face are shorter than a front-back direction length "W" in a front-back direction of the central part. The lengths "t1" and "t2" of the uneven parts are almost the same as each other.

Figure 6:
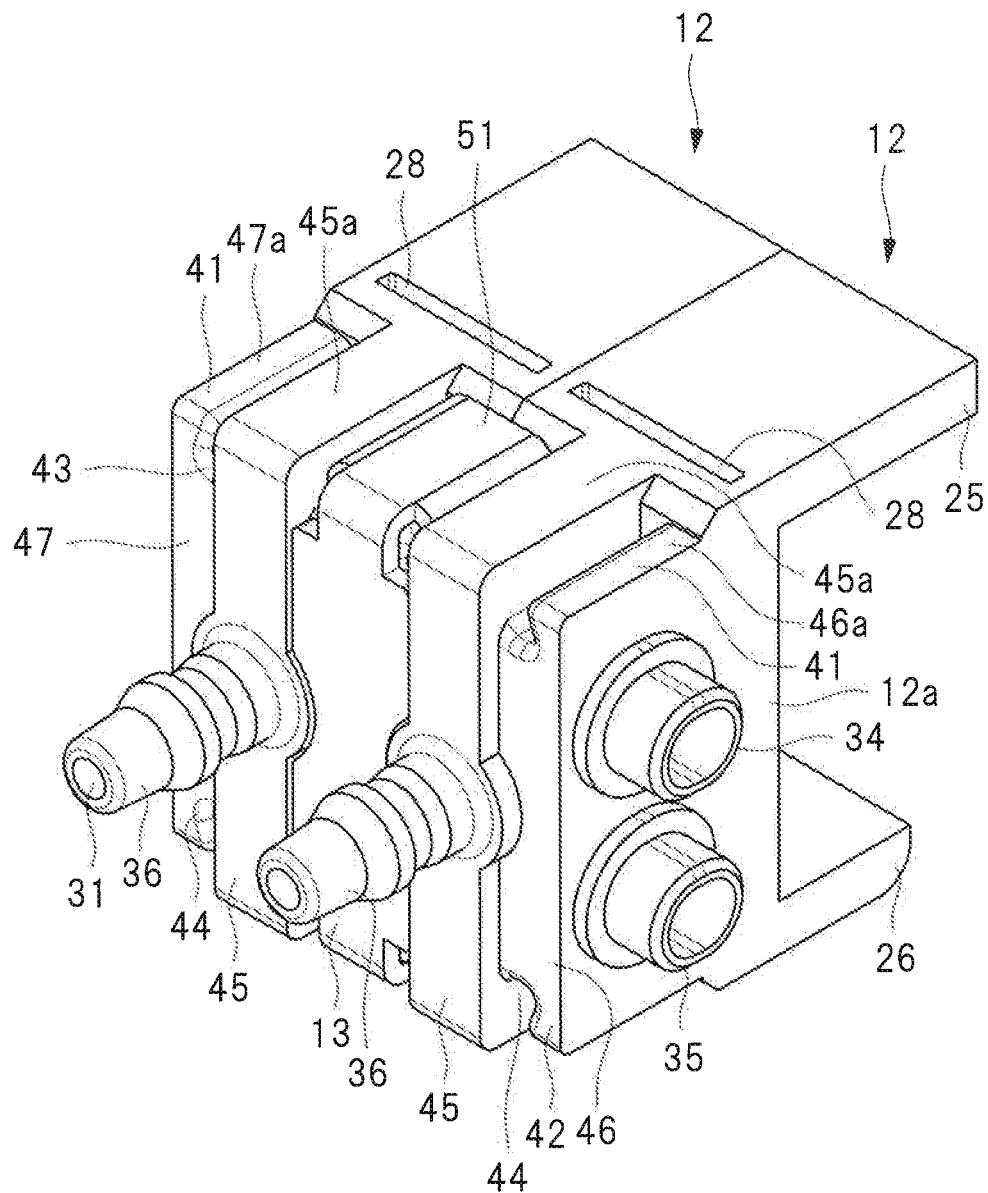
FIG. 6 is a perspective view showing two valve bases connected to each other by the connecting attachment.
Figure 7A:
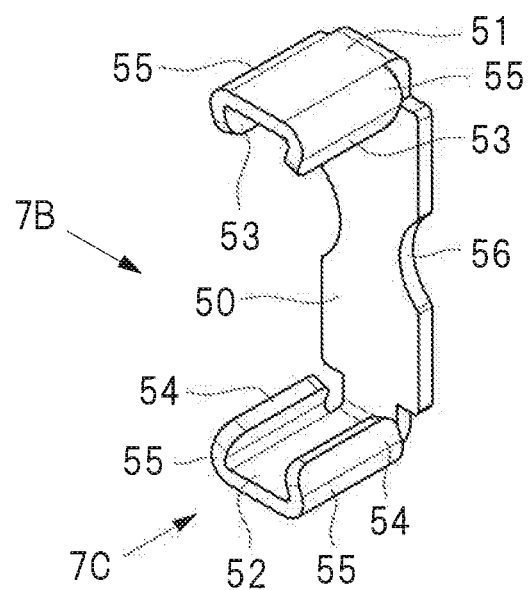
FIG. 7A is a perspective rear view showing the connecting attachment.
Figure 7B:
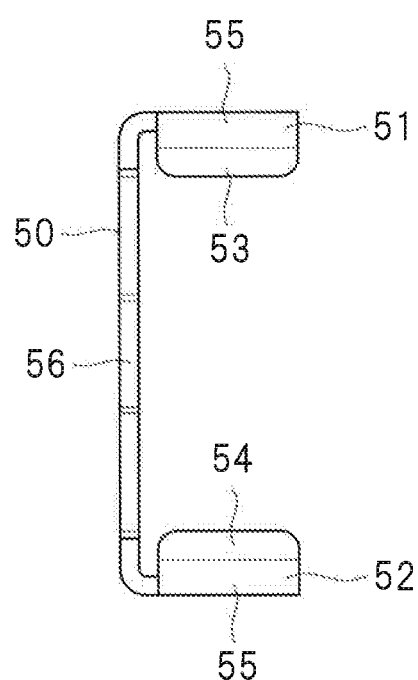
FIG. 7B is a view in the direction of an arrow "7B" of FIG. 7A, showing the connecting attachment.
Figure 7C:
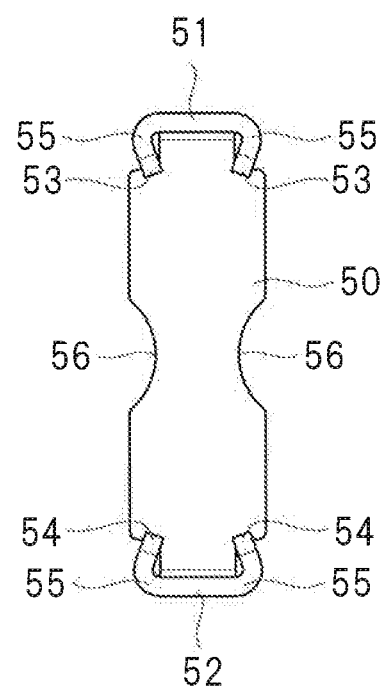
FIG. 7C is a view in the direction of an arrow "7C" of FIG. 7A, showing the connecting attachment.

The connecting attachment 13 has, as shown in FIGS. 5 to 7, a nearly-rectangular connecting piece 50, a first clamp piece 51, and a second clamp piece 52. The connecting piece 50 faces with one of the right and left side parts of the front face of one of two valve bases 12 adjacent to each other, and the other of the right and left side parts of the front face of the other of said two valve bases 12. A first clamp piece 51 is integrally provided to one end part of the connecting piece 50, and a second clamp piece 52 is integrally provided to the other end part of the connecting piece 50. Each of the clamp pieces 51 and 52 is bent in a right angle direction with respect to the connecting piece 50, and formed integrally with the connecting piece 50. In the first clamp piece 51, two claw parts 53 engaged with the first protruding part 41 of two valve bases 12 adjacent to each other are provided. In the same way, in the second clamp piece 52, two claw parts 54 engaged with the second protruding part 42 of two valve bases 12 adjacent to each other are provided. The clamp pieces 51 and 52 are the same in shape as each other, integral with respective ends of the connecting piece 50, and they face each other. The connecting attachment 13 has a symmetrical structure to the connecting piece 50 as a center thereof. Therefore, one of the clamp pieces is defined as "the first clamp piece 51", while the other of the clamp pieces is defined as "the second clamp piece 52". The connecting attachment 13 is fabricated by press working of a steel plate having a thickness "t", and the thickness "t" is almost the same as the measurement "t1" and "t2" of the above mentioned uneven parts.

By inserting the claw part 53 in the concave groove 43, the claw part 53 is meshed with the first protruding part 41. In the same way, by inserting the claw part 54 in the concave groove 44, the claw part 54 is engaged with the second protruding part 42. Each of the claw parts 53 and 54 has bent parts 55 which are received in the respective concave grooves 43 and 44.

Since two clamp pieces 51 and 52 are integral with the connecting piece 50 in the connecting attachment 13, when two valve bases 12 adjacent to each other are connected to each other, an operator holds the connecting piece 50, and inserts the claw parts 53 and 54 in the respective concave grooves 43 and 44. Therefore, valve bases 12 can be connected at both upper and lower ends thereof at the same time by the inserting operation at one time.

Cutout parts 56 are respectively provided to the right and left side of the longitudinal central part of the connecting piece 50 of the connecting attachment 13, and when the connecting attachment 13 is attached to the valve base 12, a peripheral part of the output joint 36 is partially received in the cutout part 56.

FIG. 4 shows one valve base 12, and FIG. 5 shows two valve bases 12 abutting on their side faces. As shown in FIG. 5, the connection of two valve bases 12 abutting on each other is made via the following process. Firstly, the connecting attachment 13 is brought close to the valve base 12 in the front-back direction of the valve base 12. Then, the claw parts 53 and 54 of the clamp pieces 51 and 52 are inserted into the respective concave grooves 43 and 44. When the claw part 53 is inserted in the concave groove 43, the claw part 53 comes into pressure-contact with an inner surface of the first protruding part 41, and the bent part 55 is elastically deformed, and after insertion, the claw part 53 is pressed on the inner surface of the first protruding part 41 by the elastic force of the bent part 55. In the same way, when the claw part 54 is inserted into the concave groove 44, the claw part 54 comes into pressure-contact with an inner surface of the second protruding part 42. Therefore, as shown in FIG. 6, two valve bases 12 adjacent to each other are firmly connected by the connecting attachment 13. The attaching operation of the connecting attachment 13 to the valve bases 12 adjacent to each other is only an operation by which the connecting attachment 13 is attached to the valve base 12, and the valve base 12 can be connected easily. Thereby, assembling operability to assemble the manifold solenoid valve 10 while two or more valve bases 12 are connected can be made improved.

In FIGS. 4 to 6, the solenoid valve 11 to be mounted on the valve base 12 is omitted. Before the valve bases 12 are connected to each other by the connecting attachment 13, the solenoid valves 11 may be mounted on the respective valve base 12 in advance. On the other hand, after the valve bases 12 are connected to each other by the connecting attachment 13, the solenoid valves 11 may be mounted on the respective valve bases 12.

The valve base assembly 14 shown in FIGS. 1 to 3 has eight valve bases 12 on which the solenoid valves 11 are respectively mounted. One end parts of two valve bases 12 adjacent to each other are connected to each other with the first clamp piece 51 of the connecting attachment 13, and the other end part thereof are connected to each other with the second clamp piece 52 of the connecting attachment 13. The end block 15 abuts on one end of the valve base assembly 14, and the end block 16 abuts on the other end of the valve base assembly 14. The end blocks 15 and 16 are fastened by the connecting attachments 13 to the valve bases 12 arranged at end parts of the valve base assembly 14, respectively.

On an outer peripheral surface of the output joint 36, as shown in FIG. 8, an annular engaging protruding part 57 is provided so as to protrude in a radially outward direction. The annular engaging protruding part 57 has a tapered surface 57a a becoming larger gradually in a direction from a distal end side to a rear end part, a straight surface 57b continuous to a rear end part of the tapered surface 57a, and a radial direction surface 57c continuous to a rear end of the straight surface 57b. Also, an annular engaging protruding part 57 having the same shape is provided to each outer peripheral surface of the air supply joint 37 and the exhaust joint 38.

A front face formed by the valve base assembly 14 and the end blocks 15 and 16 is totally flat, since the thickness "t" of the connecting attachment 13 is almost the same as the measurement "t1" and "t2" of each uneven part. Similarly, the top side face and the bottom side face, formed by the valve base assembly 14 and the end blocks 15 and 16, are totally flat. A block mounting face 60a is formed by the flat front face of the valve base assembly 14, and the front face of the connecting attachment 13 also forms part of the block mounting face 60a. In addition, each front face of the end blocks 15 and 16 is a flat extension face 60b continuous from the block mounting face 60a. The output joint 36, the air supply joint 37, and the exhaust joint 38, each of which is used as a joint member, are arranged on the extension face 60b and block mounting face 60a which collectively form one face.

On the flat block mounting face 60a and the flat extension face 60b of the manifold solenoid valve 10, which collectively form a flat face, a flow passage block 61 is mounted as shown in FIG. 3. The end blocks 15 and 16 are respectively provided with mounting holes 62 and 63 for attaching the flow passage block 61, and the flow passage block 61 is provided with mounting holes 62a and 63a corresponding to the mounting holes 62 and 63. The flow passage block 61 is fastened on the front face of the manifold solenoid valve 10 by screw members (not shown) which are mounted in the respective mounting holes.

As shown in FIG. 3, the flow passage block 61 is provided with connecting holes 64, the output joints 36 are received in the respective connecting holes 64, the number of the output joints 36 corresponds to the number of those of the flow passage block 61, the connecting holes 64 open on the back face of the flow passage block 61, that is, an abutting face of the flow passage block 61. In the same way, in the flow passage block 61, a connecting hole 65 into which the air supply joint 37 enters, and a connecting hole 66 into which the exhaust joint 38 enters are provided. Air flow passages 64a to 66a which communicate with connecting holes 64 to 66 are respectively provided to the flow passage block 61.

The air flow passages 64a communicates with output hole 31 of the output joint 36, and the air flow passage 65a communicates with the communicating hole 37a of the air supply joint 37, and the air flow passage 66a communicates with the communicating hole 38a of the exhaust joint 38. In order to make the output hole 31 communicate with the air flow passage 64a with sealing being carried out between the output joint 36 and the connecting hole 64, as shown in FIG. 3, a joint seal member 71 is detachably attached to the output joint 36. In the same way, in order to make the communicating hole 37a communicate with the air flow passage 65a, a joint seal member 72 is detachably attached to the air supply joint 37 with sealing being carried out between the air supply joint 37 and the connecting hole 65. Furthermore, in order to make the communicating hole 38a communicate with the air flow passage 66a, a joint seal member 73 is detachably attached to the exhaust joint 38 with sealing being carried out between the exhaust joint 38 and the connecting holes 66. The joint seal member 71 is a joint seal member for output, and the joint seal members 72 and 73 are joint seal members for supply and exhaust, respectively.

In FIG. 3, the manifold solenoid valve is shown with one of eight joint seal members 71 being removed from the output joint 36, shown with the joint seal member 72 being attached to the air supply joint 37, and shown with the joint seal member 73 being removed from the exhaust joint 38.

The joint seal member 71 has an inner peripheral surface corresponding to an outer peripheral surface of the output joint 36, an annular recess part 74 is provided on this inner peripheral surface, and the annular engaging protruding part 57 of the output joint 36 is fitted into the annular recess part 74. Two annular protruding seal parts 75 and 76 are provided on an outer peripheral surface of the joint seal member 71 so as to come in contact with an inner peripheral surface of the connecting hole 64. Each output diameter of the protruding seal parts 75 and 76 of the joint seal member 71 to be mounted between the output joint 36 and the connecting hole 64 is larger than an inner diameter of the connecting hole 64. Therefore, when the joint seal member 71 is incorporated between the output joint 36 and the connecting hole 64, sealing is carried out between the outer peripheral surface of the output joint 36 and the inner peripheral surface of the connecting hole 64 by contraction of both protruding seal parts 75 and 76 in a radial direction, thereby surely preventing air from leaking from between the connecting hole 64 and the output joint 36 to the outside.

One protruding seal part 75 corresponds to the annular engaging protruding part 57 of the output joint 36. Therefore, the protruding seal part 75 is strongly pressed on the annular engaging protruding part 57 of the output joint 36 with the joint seal member 71 being incorporated, thereby enhancing a seal force.

The joint seal member 71, a configuration in which the outer diameter is made to be the same on the whole can also be used without the protruding seal parts 75 and 76 being provided on the outer peripheral surface. In that case, the inner peripheral surface of the joint seal member 71 comes in contact with the whole outer peripheral surface of the output joint 36. On the other hand, as mentioned above, when the protruding seal parts 75 and 76 are provided on the joint seal member 71, the outer peripheral surface of the joint seal member 71 will come in contact with the inner peripheral surface of the connecting hole 64 only at the protruding seal parts 75 and 76. Thereby, a contact strength of the joint seal member 71 to the output joint 36 becomes higher than an contact strength to the connecting hole 64. Therefore, when the flow passage block 61 is removed from the front face of the manifold solenoid valve 10, the joint seal member 71 is mounted on the output joint 36 without remaining in the connecting hole 64. Since the joint seal member 71 remains in the output joint 36 when the flow passage block 61 is removed from the manifold solenoid valve 10, replacement work of the joint seal member 71 can be performed easily.

The joint seal members 71 to 73 are the same in structure as each other, but the joint seal member 72 to be mounted on the air supply joint 37 and the joint seal member 73 to be mounted on the exhaust joint 38 are larger in diameter than the joint seal member 71 to be mounted on the output joint 36. The joint seal members 72 and 73 are the same in diameter as each other.

When the flow passage block 61 is mounted on the valve base 12, the joint seal members 71 to 73 are fitted into the respective connecting holes 64 to 66 of the flow passage block 61. Therefore, when changing a gap between the valve base 12 and the flow passage block 61, the protruding seal parts 75 and 76 of the joint seal members 71 to 73 are only moved in an axial direction in the inside of the connecting holes 64 to 66, and the air can be prevented surely from leaking out from between the valve base 12 and the flow passage block 61.

In the flow passage block 61 shown in FIG. 3, provided are the air flow passage 64a which communicates with the output hole 31, the air flow passage 65a which communicates with the common air supply flow passage and the air flow passage 66a which communicates with the common exhaust flow passage. Therefore, by mounting the flow passage block 61 on the manifold solenoid valve 10, the air flow passage can be made to communicate with the output joint 36, etc. without connecting a hose and pipe to the output joint 36 etc. However, only the air flow passages 64a which communicate with the output holes 31 may be made to be provided to the flow passage block 61. In that case, tubes are directly mounted on the air supply joint 37 and the exhaust joint 38. In addition, although each of the air flow passages 64a, 65a and 66a is shown as a simple straight flow passage in the flow passage block 61, an air flow passage having an optional shape can be provided to the flow passage block 61.

Figure 9:
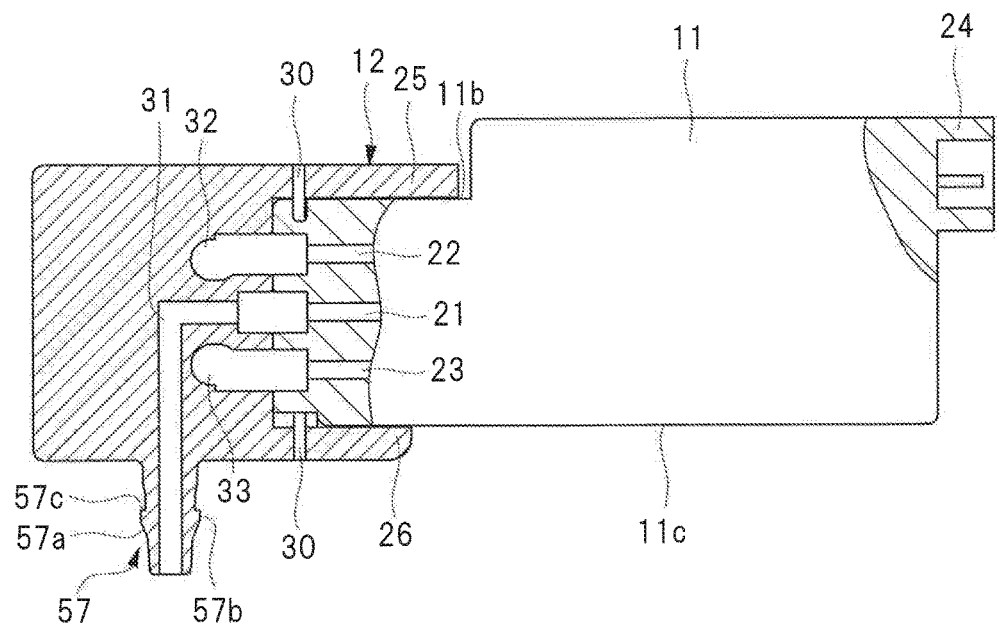
FIG. 9 is a sectional view showing a valve base according to another embodiment.

FIG. 9 is a sectional view illustrating another embodiment of the valve base 12. This valve base 12 has the output joint 36 provided so as to protrude from the bottom side face 11c of the valve base 12. Other structures are the same as those of the above mentioned valve base 12. In the configuration shown in FIG. 9, the flow passage block 61 is mounted on the bottom side face 11c of the valve base 12. When the air supply joint 37 and exhaust joint 38 is also provided so as to protrude from the bottom face of the end blocks 15 and 16, by mounting the flow passage block 61 on the manifold solenoid valve 10, supply of the air to each of the solenoid valves 11 and discharging of the air discharged from the solenoid valve 11 can be performed by the flow passage block 61. The output joint 36, air supply joint 37 and exhaust joint 38 may be made to be provided each on the surface 11b of the valve base 12.

FIG. 3 shows the flow passage block 61 mounted on the stacking type manifold solenoid valve 10. However, in the flow passage block mounted on the integrated type manifold solenoid valve, the joint seal member may seal the joint member and the flow passage block.

The present invention is not limited to the above-mentioned embodiments, and can be modified variously in the range without departing from the substance. For example, although the air supply joint 37 and exhaust joint 38 are provided on the end blocks 15 and 16 which are mounted on both end faces of the valve base assembly 14, the air supply joint 37 and exhaust joint 38 may be made to be provided on one end block.

EXPLANATION OF REFERENCES 10 manifold solenoid valve
11 solenoid valve
12 valve base
13 connecting attachment
14 valve base assembly
15 and 16 end blocks
21 output port
22 air supply port
23 exhaust port
30 fastener
31 output hole 32 air supply hole
33 exhaust hole
36 output joint
37 air supply joint
38 exhaust joint
41 first protruding part
42 second protruding part
43 and 44 concave grooves
45 central part
46 and 47 side part in width direction
50 connecting piece
51 first clamp piece
52 second clamp piece
53 and 54 claw parts
55 bent part
56 cutout part
57 annular engaging protruding part
61 flow passage block
64 to 66 connecting holes
64a to 66a air flow passages
71 to 73 joint seal member
74 annular recess part
75 protruding seal part
76 protruding seal part

What is claimed is:

1. A manifold solenoid valve, comprising:
   valve bases on which solenoid valves are respectively mounted;
   output joints which are provided so as to protrude from the respective valve bases, the output joints communicating with output ports of the solenoid valves, and each output joint having an annular engaging protruding part projecting radially from an outer peripheral surface;
   joint seal members mounted on the output joints for outputting air, each joint seal member having an inner peripheral surface and an outer peripheral surface, the inner peripheral surfaces of the joint seal members engaging the outer peripheral surfaces of the output joints;
   wherein an annular recess part is provided on the inner peripheral surface of each joint seal member,
   the annular engaging protruding part of each output joint projecting radially is fitted into the annular recess part of the joint seal member, and
   at least one annular protruding seal part is provided on the outer peripheral surface of the joint seal members, and the one annular protruding seal part is disposed so as to correspond to the annular engaging protruding part of the output joints,
   wherein the annular engaging protruding part projecting radially from the peripheral surface of each output joint has:
   a cylindrical outer surface with a proximal end and a distal end;
   a tapered surface extending from the distal end of the cylindrical outer surface toward a distal end of the output joint; and
   a radially directed surface extending radially inwardly from the proximal end of the cylindrical outer surface.

2. The manifold solenoid valve according to claim 1, wherein a block mounting face, on which a flow passage block is mounted, is formed by the valve bases abutting on each other.

3. The manifold solenoid valve, according to claim 2, wherein
   the at least one annular protruding seal part comprises first and second annular protruding seal parts integrally provided on the outer peripheral surface of the joint seal member, with the first annular protruding part corresponding to the annular engaging protruding part of the output joint; and
   the first and second annular protruding seal parts of the joint seal member are brought into contact with an inner peripheral surface of a connecting hole of the flow passage block.

4. The manifold solenoid valve according to claim 3, wherein
   the second annular protruding part of the joint seal member is located between the first annular protruding part of the joint seal member and the valve base.

5. The manifold solenoid valve according to claim 3, wherein
   a distal end of the joint seal member is disposed between an end face of the output joint and a bottom face of the connecting hole of the flow passage block.

6. The manifold solenoid valve according to claim 2, comprising end blocks which are mounted on end faces of a valve base assembly formed by abutting the valve bases, each end block is provided with an extension face which is continuous to the block mounting face, wherein
   at least one of an air supply joint for communicating with an air supply port of the solenoid valve and an exhaust joint for communicating with an exhaust port of the solenoid valve are provided on at least one of the end block so as to protrude from the extension face,
   a joint seal member for supplying and exhausting air is detachably mounted on at least one of the air supply joint and the exhaust joint, and
   the joint seal member for supplying and exhausting air has a recess part on an inner peripheral surface thereof, an annular engaging protruding part of an outer peripheral surface of at least one of the air supply joint and the exhaust joint is fitted into the recess part; and the joint seal member for supplying and exhausting air further has an annular protruding seal part on an outer peripheral surface thereof.

7. The manifold solenoid valve according to claim 6 further comprising:
   a first end block which is mounted on one end face of a valve base assembly formed by abutting the valve bases, and which is provided with a first extension face which is continuous to the block mounting face,
   a second end block which is mounted on the other end face of the valve base assembly formed by abutting the valve bases, and which is provided with a second extension face which is continuous to the block mounting face,
   wherein an air supply joint for communicating with an air supply port of the solenoid valve is provided so as to protrude from the first extension face of one of the first and second end blocks,
   an exhaust joint for communicating with an exhaust port of the solenoid valve is provided so as to protrude from the second extension face of the other of the first and second end blocks, and
   the joint seal members for supplying and exhausting air are detachably mounted on the air supply joint and the exhaust joint, respectively.

* * * * *